US010825309B2

(12) United States Patent
Ooki et al.

(10) Patent No.: US 10,825,309 B2
(45) Date of Patent: Nov. 3, 2020

(54) THEFT SENSING SYSTEM FOR FUSION SPLICER DEVICE AND FUSION SPLICER DEVICE

(71) Applicant: SEI OPTIFRONTIER CO., LTD., Yokohama-shi, Kanagawa (JP)

(72) Inventors: Kazuyoshi Ooki, Yokohama (JP); Makoto Miyamori, Yokohama (JP)

(73) Assignee: SEI OPTIFRONTIER CO., LTD., Yokohama-shi (JP)

( * ) Notice: Subject to any disclaimer, the term of this patent is extended or adjusted under 35 U.S.C. 154(b) by 0 days.

(21) Appl. No.: 16/618,708

(22) PCT Filed: Jun. 23, 2017

(86) PCT No.: PCT/JP2017/023212
§ 371 (c)(1),
(2) Date: Dec. 2, 2019

(87) PCT Pub. No.: WO2018/235265
PCT Pub. Date: Dec. 27, 2018

(65) Prior Publication Data
US 2020/0134994 A1 Apr. 30, 2020

(51) Int. Cl.
*G08B 13/14* (2006.01)
*G02B 6/255* (2006.01)
(Continued)

(52) U.S. Cl.
CPC ....... *G08B 13/1427* (2013.01); *G02B 6/2553* (2013.01); *G06F 21/31* (2013.01); *G08B 13/2417* (2013.01); *G08B 13/2454* (2013.01)

(58) Field of Classification Search
CPC ............ G08B 13/1427; G08B 13/2454; G02B 6/2553; G06F 21/31
(Continued)

(56) References Cited

U.S. PATENT DOCUMENTS

2005/0238298 A1* 10/2005 Roark .................. G02B 6/2553
385/96
2008/0218367 A1 9/2008 Yanagi et al.
(Continued)

FOREIGN PATENT DOCUMENTS

JP 2003-288328 A 10/2003
JP 3113003 U 9/2005
(Continued)

OTHER PUBLICATIONS

Sep. 5, 2017 Search Report issued in International Patent Application No. PCT/JP2017/023212.

*Primary Examiner* — John A Tweel, Jr.
(74) *Attorney, Agent, or Firm* — Oliff PLC

(57) ABSTRACT

Disclosed is a theft sensing system for sensing a theft of a fusion splicer by using an information terminal. The system includes a wireless communication unit that enables the fusion splicer to perform wireless communication with the information terminal, an authentication processing unit that performs an authentication process such that the fusion splicer and the information terminal are wirelessly connected to each other, an acquisition unit that acquires wireless situation data between the fusion splicer and the information terminal which are wirelessly connected to each other, a decision unit that decides whether the fusion splicer moves in a direction away from the information terminal based on a change in the wireless situation data acquired by the acquisition unit, and a notification unit that performs a predetermined notification process in the information terminal when the decision unit decides that the fusion splicer moves in the direction away from the information terminal.

8 Claims, 10 Drawing Sheets

(51) Int. Cl.
  *G06F 21/31* (2013.01)
  *G08B 13/24* (2006.01)
(58) Field of Classification Search
  USPC .................................................. 340/572.1
  See application file for complete search history.

(56) References Cited

U.S. PATENT DOCUMENTS

| | | |
|---|---|---|
| 2013/0284377 A1 | 10/2013 | Takayanagi et al. |
| 2016/0143407 A1 | 5/2016 | Lim et al. |
| 2017/0213433 A1 | 7/2017 | Qin et al. |
| 2020/0134997 A1* | 4/2020 | Ooki .................. G08B 13/22 |

FOREIGN PATENT DOCUMENTS

| | | |
|---|---|---|
| JP | 2007-122558 A | 5/2007 |
| JP | 2008-217568 A | 9/2008 |
| JP | 2010-175374 A | 8/2010 |
| JP | 2012-141357 A | 7/2012 |
| JP | 2016-531219 A | 10/2016 |
| JP | 2017-027537 A | 2/2017 |
| WO | 2012/090335 A1 | 7/2012 |
| WO | 2016/049820 A1 | 4/2016 |

* cited by examiner

*Fig.6*

| RADIOWAVE INTENSITY | RESPONSE TIME | DISTANCE BETWEEN FUSION SPLICER AND INFORMATION TERMINAL |
|---|---|---|
| -40dBm | 0.01ms | 1m |
| -50dBm | 0.05ms | 8m |
| -60dBm | 0.20ms | 17m |
| -70dBm | 1.00sec | 20m |
| -80dBm | 2.00sec | 30m |
| -90dBm | 4.00sec | 35m |

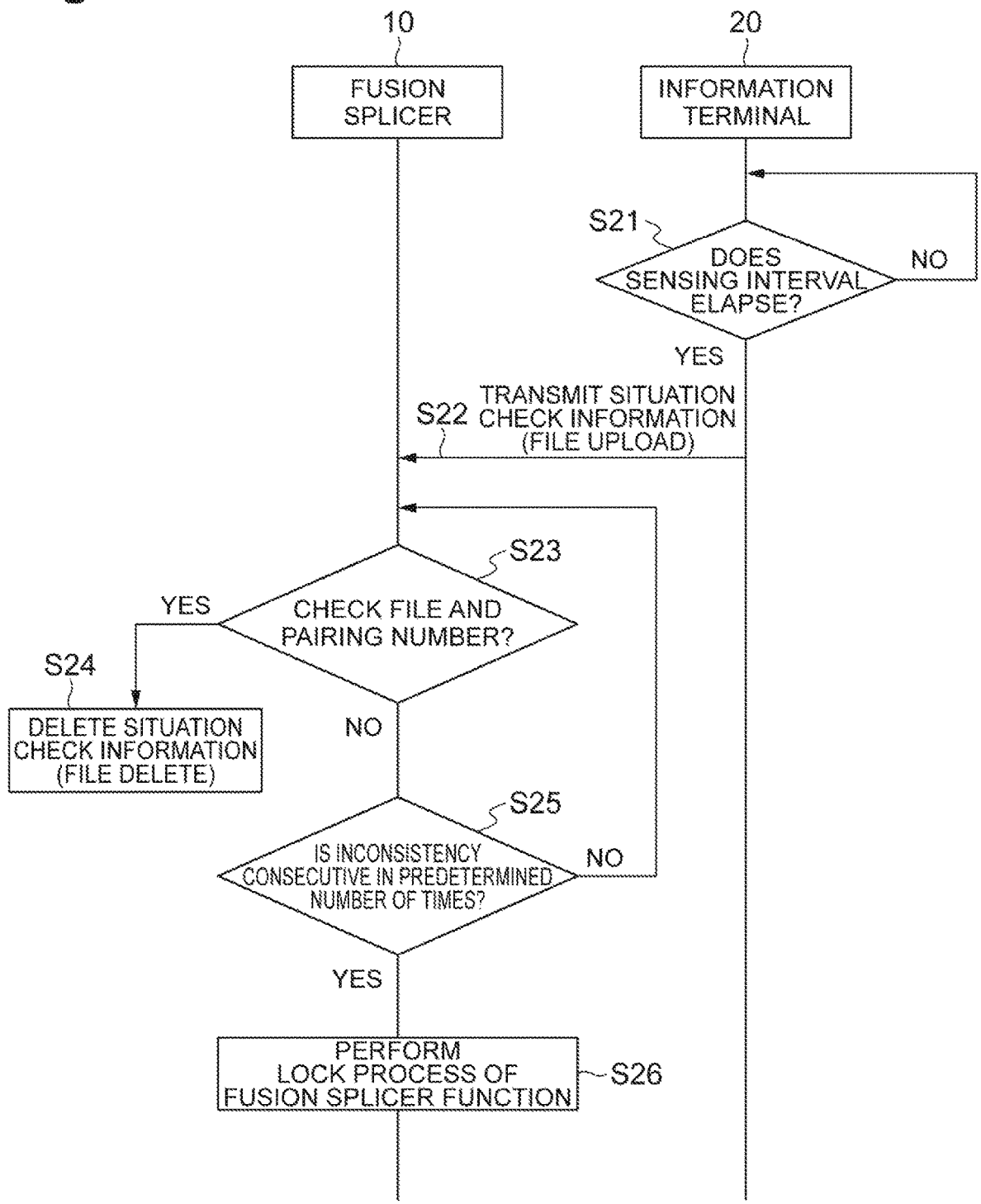

US 10,825,309 B2

THEFT SENSING SYSTEM FOR FUSION SPLICER DEVICE AND FUSION SPLICER DEVICE

TECHNICAL FIELD

The present invention relates to a theft sensing system for a fusion splicer and the fusion splicer.

BACKGROUND ART

For example, a fusion splicer disclosed in Patent Literature 1 is known as a device for splicing optical fibers each other.

CITATION LIST

Patent Literature

[Patent Literature 1] Japanese Unexamined Patent Publication No. JP2012-141357

SUMMARY OF INVENTION

A theft sensing system of the present disclosure is a theft sensing system for sensing a theft of a fusion splicer by using an information terminal. The theft sensing system includes: a wireless communication unit that enables the fusion splicer to perform wireless communication with the information terminal; an authentication processing unit that performs an authentication process such that the fusion splicer and the information terminal are wirelessly connected to each other; an acquisition unit that acquires wireless situation data between the fusion splicer and the information terminal which are wirelessly connected to each other through the authentication process; a decision unit that decides whether or not the fusion splicer moves in a direction away from the information terminal based on a change in the wireless situation data acquired by the acquisition unit; and a notification unit that performs a predetermined notification process in the information terminal in a case where the decision unit decides that the fusion splicer moves in the direction away from the information terminal.

BRIEF DESCRIPTION OF DRAWINGS

FIG. 6 is a diagram illustrating an example of a distance database included in the theft sensing system illustrated in FIG. 3.

FIG. 10 is a sequence diagram illustrating a lock process performed on the fusion splicer in the theft sensing system illustrated in FIG. 3.

DESCRIPTION OF EMBODIMENTS

Figure 1:
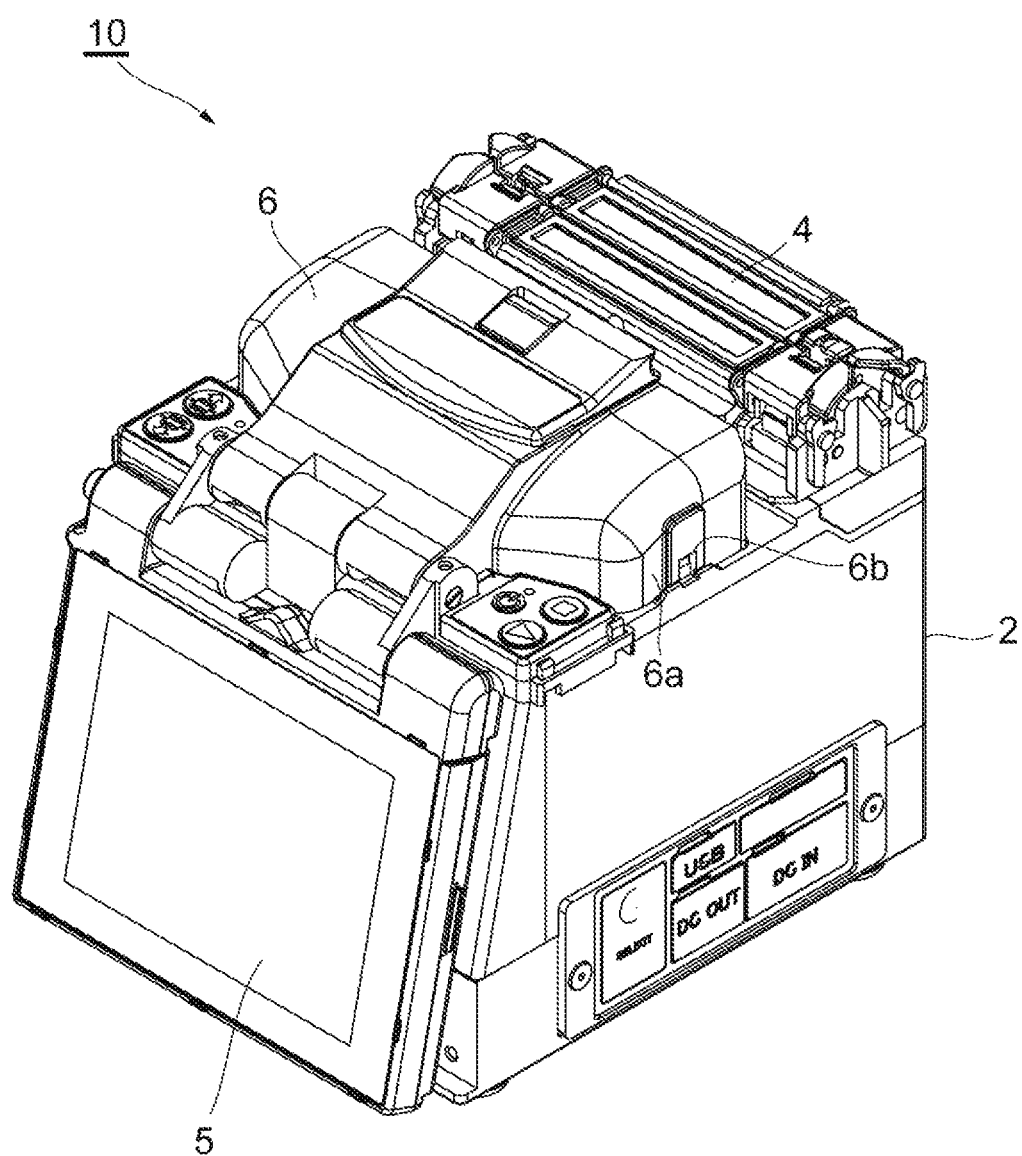
FIG. 1 is a perspective diagram illustrating a fusion splicer.

Problem to be Solved by Present Disclosure

The fusion splicer disclosed in Patent Literature 1 is used, for example, in a site where optical fibers are laid. In the laying site, a user of the fusion splicer performs other operations in addition to an operation for fusion splicing optical fibers, and then the user would leave the fusion splicer. On this occasion, the fusion splicer could be stolen. To prevent such a theft, it is considered that the fusion splicer is provided with a security function, such as a lock mechanism using a password. It is, however, difficult to prevent the theft itself of the fusion splicer by using the security function such as the password. Further, the fusion splicer could be resold if the password thereof is cracked. Therefore, further improvement is desired from a viewpoint of the theft prevention.

An object of the present disclosure is to provide a theft sensing system for a fusion splicer and the fusion splicer, which is capable of preventing the theft of the fusion splicer.

Advantageous Effects of Present Disclosure

According to a theft sensing system for a fusion splicer and the fusion splicer of the present disclosure, it is possible to prevent a theft of the fusion splicer.

Description of Embodiments of Present Invention

Embodiments of the present invention will be listed and described.

A theft sensing system according to one aspect of the present invention is a theft sensing system for sensing a theft of a fusion splicer by using an information terminal. The theft sensing system includes: a wireless communication unit that enables the fusion splicer to perform wireless communication with the information terminal; an authentication processing unit that performs an authentication process such that the fusion splicer and the information terminal are wirelessly connected to each other; an acquisition unit that acquires wireless situation data between the fusion splicer and the information terminal which are wirelessly connected to each other through the authentication process; a decision unit that decides whether or not the fusion splicer moves in a direction away from the information terminal based on a change in the wireless situation data acquired by the acquisition unit; and a notification unit that performs a predetermined notification process in the information terminal in a case where the decision unit decides that the fusion splicer moves in the direction away from the information terminal.

The theft sensing system acquires the wireless situation data between the fusion splicer and the information terminal, decides movement of the fusion splicer based on the change in the acquired wireless information data, and performs the notification process in the information terminal in the case where the fusion splicer moves in the direction away from the information terminal. According to the theft sensing system, it is possible to sense that the fusion splicer moves in the direction away from the position of the information terminal based on a position of the information terminal which is normally portable by a user and to easily notify a fact of the movement to the user. Thus, it is possible to prevent the theft of the fusion splicer.

The theft sensing system may further include a distance table in which a relationship between the wireless situation data between the fusion splicer and the information terminal and a distance between the fusion splicer and the information terminal is predetermined. The decision unit may calculate the distance between the fusion splicer and the information terminal by collating the wireless situation data acquired by the acquisition unit with the distance table, and may decide that the fusion splicer moves in the direction away from the information terminal in a case where the calculated distance is longer than a distance calculated before. According to the theft sensing system, the movement of the fusion splicer is decided using the predetermined distance table, and thus it is possible to simplify a decision process.

In the theft sensing system, the acquisition unit may acquire the wireless situation data which includes radio wave intensity between the fusion splicer and the information terminal. The acquisition unit may acquire the wireless situation data which includes a response time of the wireless communication between the fusion splicer and the information terminal. The acquisition unit may acquire the wireless situation data which includes the radio wave intensity between the fusion splicer and the information terminal and the response time of the wireless communication between the fusion splicer and the information terminal. According to the theft sensing system, the movement of the fusion splicer is decided using information relevant to a wireless device which is often provided to add another function (for example, general data management of the fusion splicer or the like), and thus it is possible to provide a new function, such as theft prevention, to the fusion splicer without adding new components or reducing the addition of the new components.

In the theft sensing system, the acquisition unit may consecutively acquire the wireless situation data on a predetermined cycle. According to the theft sensing system, the wireless situation data is consecutively acquired on the predetermined cycle, and thus it is possible to continue to sense that the fusion splicer is separated from the information terminal due to the movement. Thus, the movement of the fusion splicer other than the theft is excluded from the decision and the decision of the theft of the fusion splicer is more certainly performed, thereby enabling the theft to be prevented more and more.

The theft sensing system may further include a lock unit that locks a function of the fusion splicer in the fusion splicer in a case where the decision unit decides that the fusion splicer moves in the direction away from the information terminal or in a case where the decision unit decides that wireless communication between the fusion splicer and the information terminal is disconnected. According to the theft sensing system, even in a case where the theft of the fusion splicer occurs, the fusion splicer is locked (disabling process) from the information terminal. Even in a case where only the theft of the fusion splicer is performed, it is difficult to release the lock, and thus it is possible to prevent the theft of the fusion splicer more and more. In this case, the theft sensing system may further include a first releasing unit that controls release of the lock performed by the lock unit, and the first releasing unit may be provided on the information terminal. The theft sensing system may further include a second releasing unit that controls the release of the lock performed by the lock unit; and a server that acquires information of authentication performed by the authentication processing unit, and the second releasing unit may be provided in the server, and the server may be capable of transmitting a signal for releasing the lock performed by the lock unit to the fusion splicer by using the information of the authentication. In a case where such release means is provided, the lock is released through an appropriate procedure performed by the proper user even in a case where the fusion splicer is locked, and thus it is possible to allow the fusion splicer to be used again.

The theft sensing system may further include a position acquisition unit that acquires positional information of the fusion splicer. In a case where the position acquisition unit is included, it is possible to accumulate the positional information relevant to a theft position in a theft report or theft insurance on the information terminal even in a case where the theft occurs. Thus, even in the case where the theft occurs, it is possible to simplify various processes after the theft occurs.

According to another aspect of the present invention, there is provided a fusion splicer, which is capable of sensing a theft of the fusion splicer by using an information terminal. The fusion splicer includes: a wireless communication unit that performs wireless communication with the information terminal; an authentication processing unit that performs an authentication process for wirelessly connecting the fusion splicer to the information terminal; and a response processing unit that provides a response, which is information for deciding that the fusion splicer moves in a direction away from the information terminal, and which is for wireless situation data between the fusion splicer and the information terminal that are wirelessly connected through the authentication process, with respect to the information terminal. In the fusion splicer, it is possible to show advantages described in the above-described theft sensing system.

Details of Embodiments of Invention

A theft sensing system for a fusion splicer according to an embodiment of the present invention is described with reference to the accompanying drawings below. Note that, the present invention is not limited to the illustrations. It is intended that the present invention is illustrated in claims and all changes are possible within meanings and scopes which are equivalent to claims.

Figure 2:
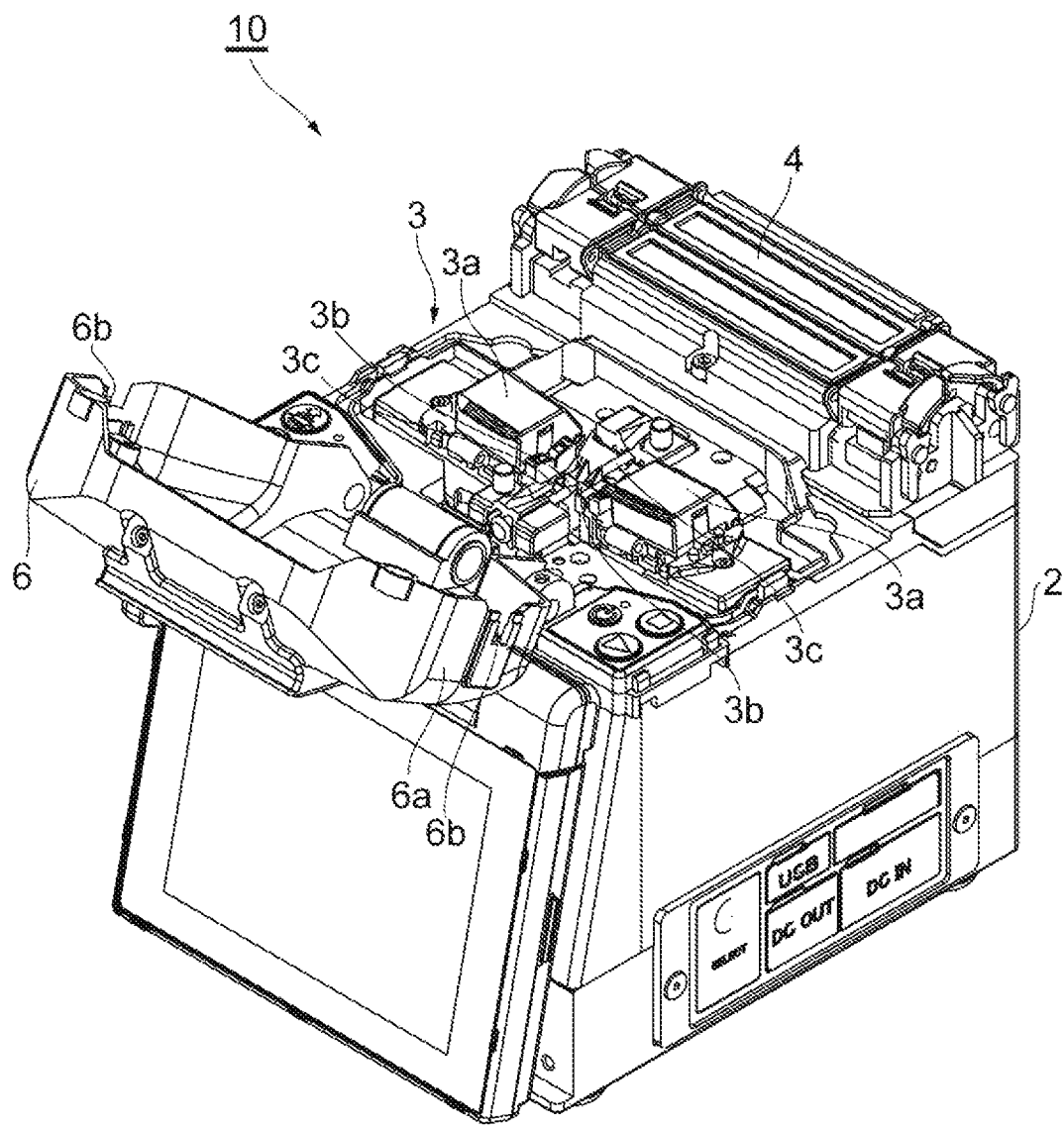
FIG. 2 is a perspective diagram illustrating a fusion splicing unit (internal structure) for fusion-splicing optical fibers in the fusion splicer illustrated in FIG. 1.

A fusion splicer 10 whose theft is sensed by a theft sensing system 1 is described with reference to FIGS. 1 and 2. FIGS. 1 and 2 are perspective diagrams illustrating an appearance of the fusion splicer. FIG. 1 illustrates the appearance in a state in which a windshield cover is closed, and FIG. 2 illustrates the appearance in a state in which the windshield cover is open and an internal structure of the fusion splicer is viewed. The fusion splicer 10 is a device for fusion splicing optical fibers each other, and includes a box-like housing 2 as illustrated in FIGS. 1 and 2. An upper part of the housing 2 is provided with a fusing unit 3 that fuses the optical fibers each other, and a heater 4 that heats a fiber reinforcement sleeve which covers a fusion spliced portion of the optical fibers fused by the fusing unit 3 to shrink the sleeve. The fusion splicer 10 includes a monitor 5 that displays a fusion splicing situation of the optical fibers, which is captured by a camera (not illustrated in the drawing) disposed inside the housing 2. Further, the fusion splicer 10 includes a windshield cover 6 for preventing wind from entering the fusing unit 3.

The fusing unit 3 includes a pair of fiber positioning units 3b, a pair of discharge electrodes 3c, and a holder placing part which is capable of placing a pair of optical fiber holders 3a. The respective optical fibers, which are fusing targets, are held and fixed to the optical fiber holders 3a, and the optical fiber holders are respectively placed and fixed to the holder placing part. The fiber positioning units 3b are disposed between the optical fiber holders 3a, and positions tips of the optical fibers held by the respective optical fiber holders 3a. The discharge electrodes 3c are electrodes which are disposed between the fiber positioning units 3b and which fuse the tips of the optical fibers through arc discharge.

The windshield cover 6 is connected to the housing 2 so as to cover the fusing unit 3 to be freely openable. Introducing ports 6b for introducing the optical fibers to the fusing unit 3 (that is, to the respective optical fiber holders 31) are formed on respective side surfaces 6a of the windshield cover 6.

Figure 3:
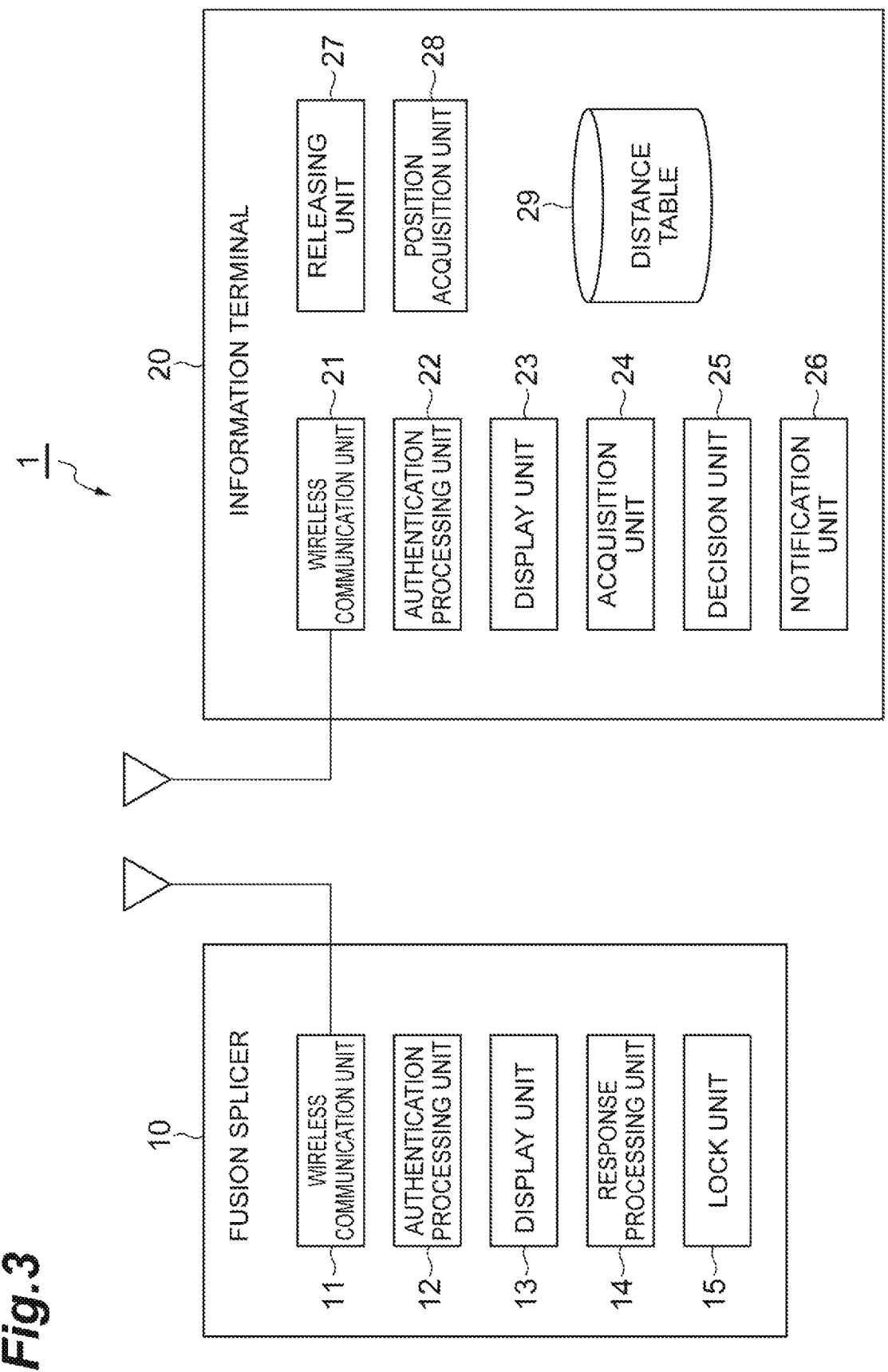
FIG. 3 is a block diagram illustrating an overview of a theft sensing system for the fusion splicer according to an aspect of the present invention.

Next, a configuration of the theft sensing system 1 for sensing the theft state of the fusion splicer 10 having the above configuration on the information terminal is described with reference to FIG. 3. FIG. 3 is a block diagram illustrating an overview of the theft sensing system for the fusion splicer according to an aspect of the present invention. As illustrated in FIG. 3, the theft sensing system 1 is formed to include the fusion splicer 10 and the information terminal 20 which are capable of being wirelessly connected to each other. Although an example in which one fusion splicer 10 is wirelessly connected to one information terminal 20 is illustrated in FIG. 3, a plurality of fusion splicers 10 may be wirelessly connected to one information terminal 20, or one or more fusion splicers 10 may be wirelessly connected to a plurality of information terminals 20.

Figure 4:
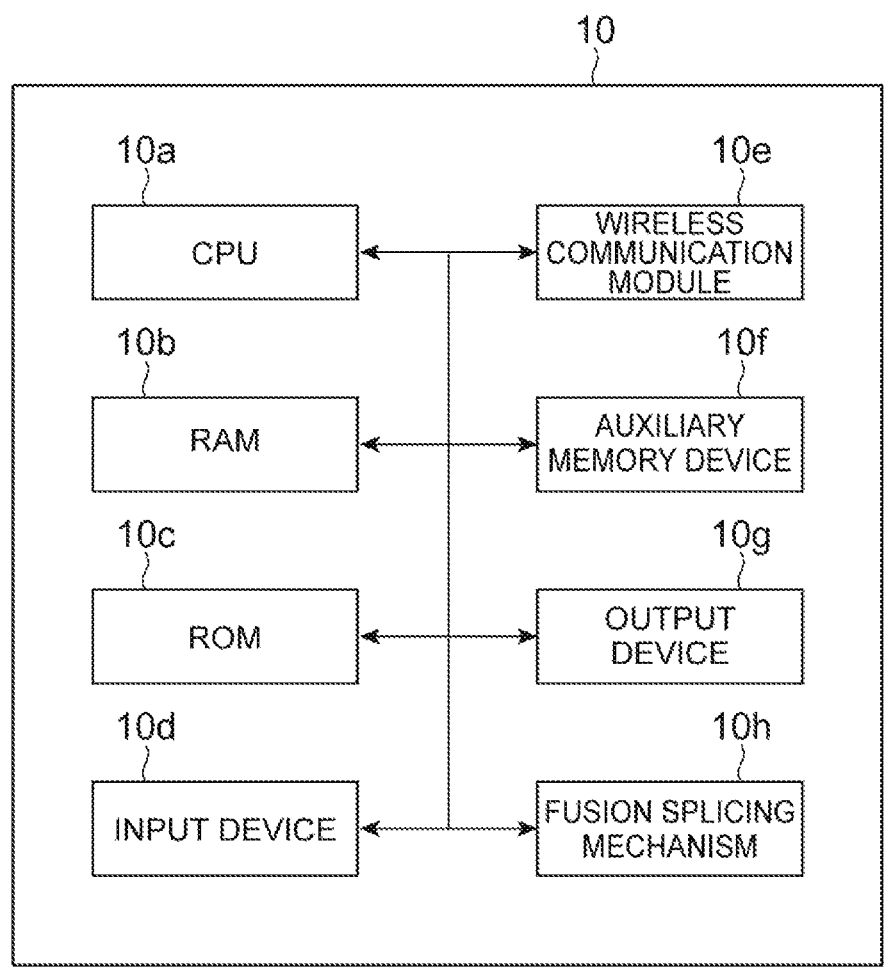
FIG. 4 is a block diagram illustrating a hardware configuration of the fusion splicer illustrated in FIG. 3.

As illustrated in FIG. 3, the fusion splicer 10 functionally includes a wireless communication unit 11, an authentication processing unit 12, a display unit 13, a response processing unit 14, and a lock unit 15. The fusion splicer 10 further includes a power source unit (battery) which drives the units. As illustrated in FIG. 4, the fusion splicer 10 is formed to include a computer which has hardware such as a CPU 10a, a RAM 10b, a ROM 10c, an input device 10d, a wireless communication module 10e, an auxiliary memory device 10f, and an output device 10g, as a control unit. In a case where the components are operated by a program or the like, respective functions of the fusion splicer 10 which is described later are exhibited. The fusion splicer 10 includes various fusion splicing mechanisms 10h in addition to the control unit.

The wireless communication unit 11 is a part which performs wireless communication with the information terminal 20 (wireless communication unit 21). The wireless communication unit 11 is formed to include, for example, a wireless LAN card or the like, and performs wireless communication with the information terminal 20 in 2.4 GHz bands in conformity with IEEE802.11.

The authentication processing unit 12 is a part which performs an authentication operation, such as a pairing process, with the information terminal 20 (authentication processing unit 22) through the wireless communication units 11 and 21. The authentication processing unit 12 extracts pairing information from a signal, which is transmitted as a message signal (for example, text (TXT) file) including the pairing information from the information terminal 20 and which is received by the wireless communication unit 11, and acquires, for example, 4-digit number information which becomes the pairing information. The authentication processing unit 12 transfers the acquired 4-digit number information to the display unit 13, displays the number on the monitor or the like for predetermined time, and displays a selection screen of "perform pairing/do not perform pairing" with the information terminal 20 using the display unit 13. When selection information indicative of "perform pairing" with the information terminal 20 is received from the display unit 13 which is described later, the authentication processing unit 12 generates a message signal indicative of "perform pairing", and transmits the message signal to the information terminal 20 (wireless communication unit 21 and the authentication processing unit 22) through the wireless communication unit 11.

The display unit 13 is formed to include, for example, the above-described monitor 5, and displays the 4-digit number, which is necessary in a case where the pairing process is performed with the information terminal 20, and the selection screen of "perform pairing/do not perform pairing" with the information terminal 20, based on instruction information from the authentication processing unit 12. The display unit 13 displays the 4-digit number on the monitor 5 or the like based on the 4-digit number of the pairing information acquired by the authentication processing unit 12, and displays the selection screen of "perform pairing/do not perform pairing" with the information terminal 20. In a case where the "perform pairing" with the information terminal 20 is selected, the display unit 13 transfers information indicative of the selection to the authentication processing unit 12.

After the pairing process (authentication) with the information terminal 20 is completed, the response processing unit 14 provides a predetermined response with respect to the message signal (situation check information) which is sent from the information terminal 20 on a predetermined cycle, for example, a reply of one delivery check signal with respect to one reception message, to the information terminal 20 at a lower protocol level through the wireless communication unit 11. In a case where the information terminal 20 receives the delivery check signal, it is possible to calculate a response time of the wireless signal (refer to FIG. 6), which is described later.

The lock unit 15 is a part which locks all or some of fusion splicing functions (fusion splicing mechanisms 10h such as fusion of the fibers through the arc discharge or heating of the fiber reinforcement sleeves) of the fusion splicer 10 and causes the functions to be disabled in a case where a predetermined condition is not satisfied. For example, as will be described later, the lock unit 15 performs a process for checking existence of the message signal or a pairing number in a file, which is wirelessly transmitted from the information terminal 20 on the predetermined cycle, and performs a process for deleting the received message signal in a case where it is possible to check that the message signal is sent on every predetermined cycle or in a case where the pairing number is equal. In contrast, in a case where the message signal does not exist (is not sent) or the pairing number is not consistent in a check process performed on the predetermined cycle, the lock unit 15 decides that the fusion splicer 10 is in the theft state and electrically locks all or some of the fusion splicing functions of the fusion splicer 10. In a case where non-existence of the message signal or inconsistency of the pairing number is consecutively generated specified number of times (for example, three times), the lock unit 15 may perform a lock process. Thus, it is possible to decide that the fusion splicer 10 is in the theft state with higher accuracy. In a case where the lock process is performed, the lock unit 15 may perform the process together with a process for automatically providing a notification to the police, buzzer notification for crime prevention, and the like.

The power source unit (battery) is accommodated inside the housing of the fusion splicer 10. It is preferable that power is normally supplied with respect to the theft sensing system 1 from the power source unit. Thus, it is possible for the theft sensing system to normally operate without being influenced by a usage state of the fusion splicer 10 (fusion splicing function). The power source unit may be shared with a unit for driving the fusion splicing mechanisms. In a case where priority is given to security, the power source unit may be different from the unit for driving the fusion splicing mechanisms, and the power source unit for the theft sensing system may be accommodated in a place from which is not possible to be taken out by a user.

Figure 5:
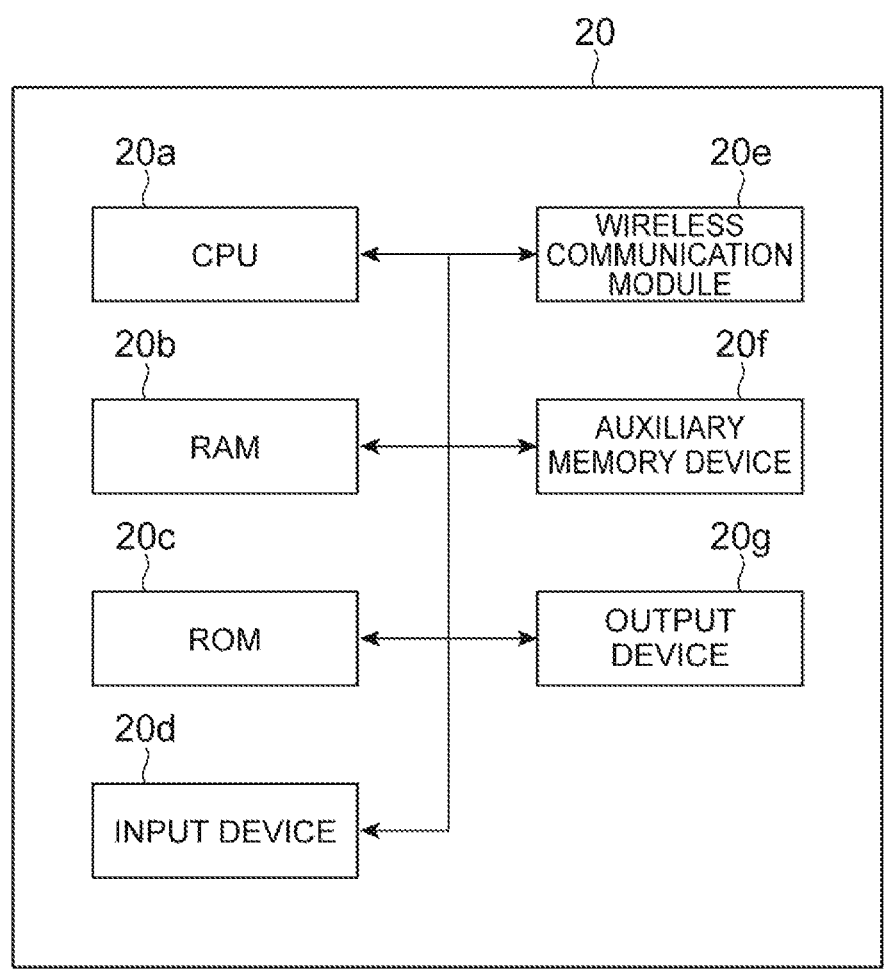
FIG. 5 is a block diagram illustrating a hardware configuration of an information terminal illustrated in FIG. 3.

The information terminal 20 is formed to include, for example, a portable wireless communication terminal such as a smart phone, and includes a wireless communication unit 21, an authentication processing unit 22, a display unit 23, an acquisition unit 24, a decision unit 25, a notification unit 26, a releasing unit 27, a position acquisition unit 28, and a distance table 29. As illustrated in FIG. 5, the information terminal 20 is formed to include a computer which has hardware such as a CPU 20a, a RAM 20b, a ROM 20c, an input device 20d, a wireless communication module 20e, an auxiliary memory device 20f, and an output device 20g. In a case where the components are operated by a program or the like, respective functions of the information terminal 20 which is described later are exhibited.

The wireless communication unit 21 is formed to include the wireless communication module 20e, and transmits and receives the various message signals to and from the wireless communication unit 11 of the fusion splicer 10 through the wireless communication. The wireless communication unit 21 is formed to include, for example, a wireless LAN module or the like which is embedded in the terminal, and performs wireless communication, for example, in 2.4 GHz bands in conformity with IEEE802.11 so as to correspond to the wireless standard of the wireless communication unit 11. In a case where it is possible to perform wireless communication with the wireless communication unit 11, another band or another communication standard may be used.

The authentication processing unit 22 performs the authentication operation, such as the pairing process, with the fusion splicer 10 (authentication processing unit 12). The authentication processing unit 22 causes the display unit 23, which is described later, to display the 4-digit number, which is the pairing information for performing the pairing process with the fusion splicer 10, and transmits the message signal which includes the 4-digit number, to the fusion splicer 10 (authentication processing unit 12) through the wireless communication unit 21. In a case where the authentication processing unit 22 receives the message signal which includes the information indicative of "perform pairing", from the fusion splicer 10 (authentication processing unit 12), the authentication processing unit 22 completes the pairing process with the fusion splicer 10. In a case where the authentication processing unit 22 receives the information indicative of "perform pairing" from the fusion splicer 10, the authentication processing unit 22 may transmit the information to a management server (not illustrated in the drawing) which generalizes a system including the theft sensing system.

The display unit 23 is a part which displays various pieces of information in the information terminal 20. The display unit 23 displays the 4-digit number, which is generated in the authentication processing unit 22, for performing the pairing on a display of the information terminal 20 for predetermined time (for example, pairing waiting time of 10 seconds). The display unit 23 displays an interval (for example, every 1 minute, every 10 minutes, every hour, or every day) for sensing existence/non-existence of the theft in the theft sensing system 1 or total time (10 minutes, one hour, 1 day, 30 days, or the like) for sensing existence/non-existence of the theft on the display as the selection screen, and transfers a desired interval or total desired time, which is selected by an operator, to the acquisition unit 24.

The acquisition unit 24 acquires wireless situation data between the fusion splicer 10 and the information terminal 20 which are wirelessly connected to each other through the authentication process. The acquisition unit 24 acquires, for example, wireless radio wave intensity or a response time of the communication between the fusion splicer 10 and the information terminal 20, as the wireless situation data, on the predetermined cycle (the above-described sensing interval). The acquisition unit 24 may acquire only the wireless radio wave intensity between the fusion splicer 10 and the information terminal 20 as the wireless situation data, may acquire only the response time of the communication between the fusion splicer 10 and the information terminal 20, or may acquire both the wireless radio wave intensity and the response time. The wireless situation data acquired in the acquisition unit 24 is not limited to the above description, and another type of information may be acquired and used in a case of wireless relevant information which corresponds to a change in a distance between the fusion splicer 10 and the information terminal 20.

The decision unit 25 decides whether or not the fusion splicer 10 moves in a direction away from the information terminal 20 based on a change in the wireless situation data acquired by the acquisition unit 24. Specifically, the decision unit 25 collates the wireless situation data (the radio wave intensity and/or the response time) acquired by the acquisition unit 24 with the distance table 29 (refer to FIG. 6), and calculates a distance between the fusion splicer 10 and the information terminal 20. For example, as illustrated in FIG. 6, a relationship between the wireless situation data (the radio wave intensity and the response time) between the fusion splicer 10 and the information terminal 20 and the distance between the fusion splicer 10 and the information terminal 20 is predetermined in the distance table 29. A predetermined relational expression may be included in advance such that distance information and the like, which are written in the distance table 29, are finely adjusted according to the radio wave intensity and the response time which are acquired on the site.

Figure 7:
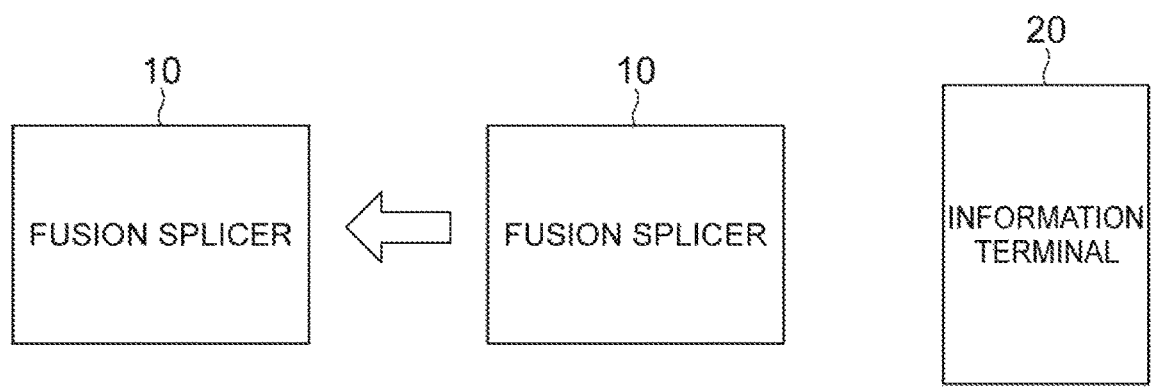
FIG. 7 is a diagram schematically illustrating movement (theft state), which is sensed in the theft sensing system illustrated in FIG. 3, of the fusion splicer.

In a case where the distance, which is calculated by being collated with the distance table 29, is longer than a distance which is calculated before (in a case where the change exists), the decision unit 25 decides that the fusion splicer 10 moves in the direction away from the information terminal 20 (refer to FIG. 7). In the decision, in a case where the decision that the calculated distance is longer than the distance calculated before is consecutive predetermined times (for example, 3 times), the decision unit 25 may decide that the fusion splicer 10 moves in the direction away from the information terminal 20. In this case, it is possible to securely exclude a case where movement of the fusion splicer 10 in a case other than the theft is mistakenly detected as the theft state.

The notification unit 26 is a part which performs a predetermined notification process in the information terminal 20 to provide a notification to the operator in a case where the decision unit 25 decides that the fusion splicer 10 moves in the direction away from the information terminal 20. In a case where the theft state is sensed, the notification unit 26 provides the notification of the theft state to the user using notification means such as sounds (buzzer), screen message display, vibration grant, and the like. Thus, it is possible for the user who holds the information terminal 20 to sense a theft situation of the fusion splicer 10.

The releasing unit 27 is a part for releasing lock in a case where the lock unit 15 of the fusion splicer 10 locks the fusion mechanism. In a case where the releasing unit 27 receives an instruction to release the lock of the fusion splicer 10, which is locked under a predetermined condition, through an input process from the user, the releasing unit 27 generates a release signal which includes pairing information maintained in the authentication processing unit 22, and transmits the release signal to the fusion splicer 10 through the wireless communication unit 21. In a case where the release signal is received on the fusion splicer 10, the pairing information included in the release signal is collated. In a case where the pairing information included in the release signal is consistent with the pairing information held on the fusion splicer 10, the lock process is released by the lock unit 15. Thus, it is possible to release the lock performed by the lock unit 15. The above-described function of the releasing unit 27 may be provided on a server of an integration system including the theft sensing system 1. Even in this case, as the same as above, it is possible for the server to perform a lock release process by transmitting a signal for releasing the lock performed by the lock unit 15 to the fusion splicer 10 using the pairing information, which is previously acquired information of authentication, through any of wireless communication means.

In a case where the decision unit 25 decides that the fusion splicer 10 moves in the direction away from the information terminal 20 or that the wireless communication between the fusion splicer 10 and the information terminal 20 is disconnected, the position acquisition unit 28 determines that the theft of the fusion splicer 10 occurs, and acquires positional information of the fusion splicer 10. In a case where the theft of the fusion splicer 10 occurs, a theft report or a subscription of theft insurance is performed. At this time, it is necessary to indicate a place of the theft. Here, in a case where the information terminal 20 acquires approximation information of a theft position, it is possible to make verification of the positional information be easy in a case of the subscription. The position acquisition unit 28 is formed to include, for example, a GPS and the like, and acquires the positional information from the GPS and the like. The position acquisition unit 28 is formed to normally or periodically acquire the positional information of the fusion splicer 10, and may acquire the positional information as specific positional information in a case where the above decision is performed.

Figure 8:
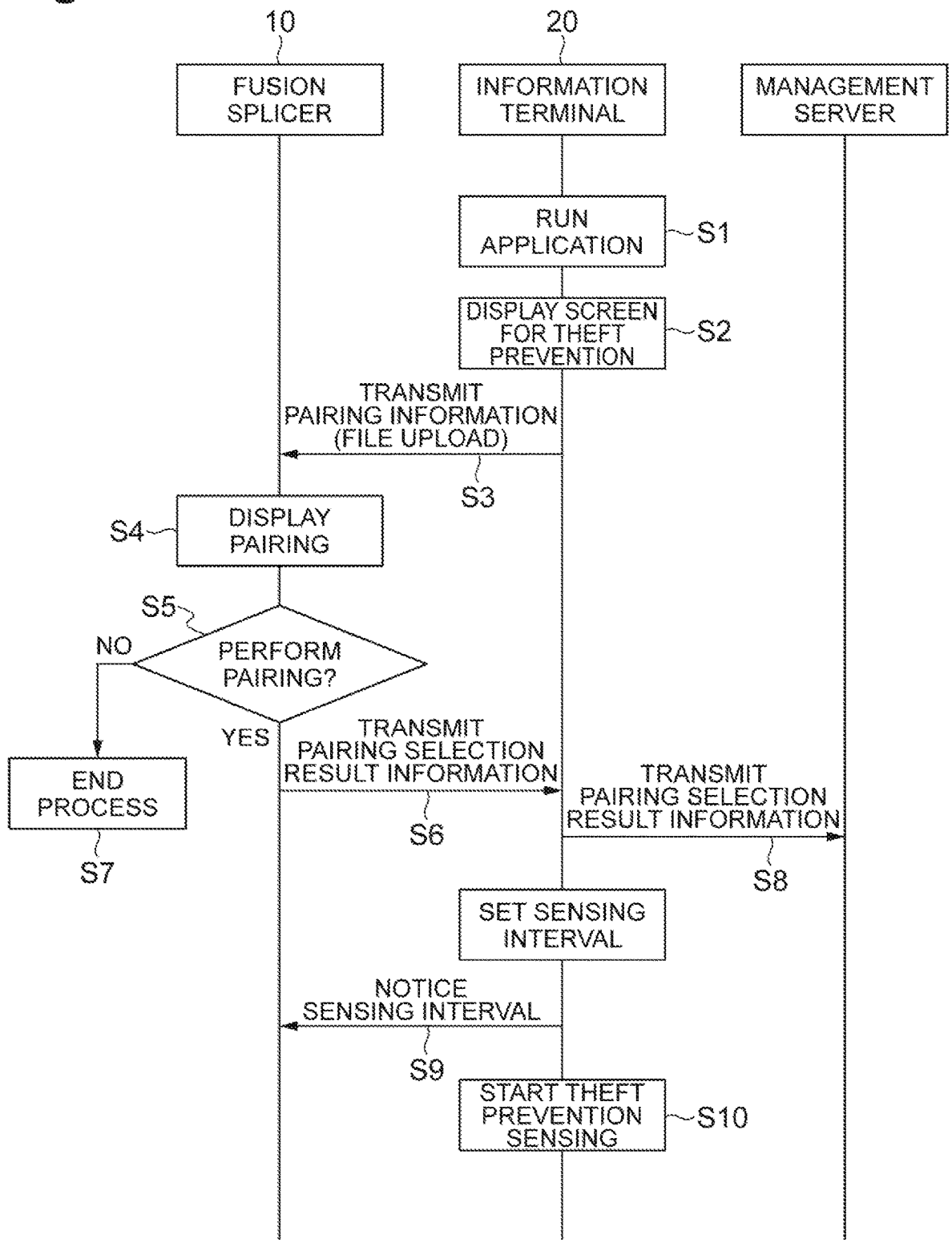
FIG. 8 is a sequence diagram illustrating a pairing process in the theft sensing system illustrated in FIG. 3.

Next, the pairing process (authentication process) in the theft sensing system 1 according to the embodiment is described with reference to FIG. 8. FIG. 8 is a sequence diagram for performing the pairing process between the fusion splicer 10 and the information terminal 20 in the theft sensing system 1.

As illustrated in FIG. 8, in the theft sensing system 1, first, an application for the theft sensing system is run by the user on the information terminal 20 (step S1). In the information terminal 20, in a case where the application is run, a screen for a theft prevention system is displayed and the 4-digit number for the pairing is displayed on the screen for predetermined time (for example, 10 seconds as the pairing waiting time) by the display unit 23 (step S2). At the approximately same time as the display of the screen in step S2, the information terminal 20 uploads (transmits) the message signal (for example, the TXT file), which includes the pairing information for cross-authentication, to the fusion splicer 10 using the wireless communication unit 21 (step S3). The message signal is not limited to the text file.

Subsequently, on the fusion splicer 10 which receives the message signal that includes the pairing information using the wireless communication unit 11, the authentication processing unit 12 extracts the 4-digit number information for the pairing, which is included in the message signal, and displays the 4-digit number on the monitor (step S4) or the like. The fusion splicer 10 displays the selection screen of "perform pairing/do not perform pairing with the information terminal 20" on the monitor using the authentication processing unit 12. Then, the user of the fusion splicer 10 (the same as the user of the information terminal 20) selects any of selection items of "perform pairing/do not perform pairing" (step S5). In a case where the fusion splicer 10 receives selection indicative of "perform pairing" using the authentication processing unit 12, the fusion splicer 10 generates a message signal (pairing selection result information) indicative of "perform pairing", and transmits (uploads) the message signal to the information terminal 20 through the wireless communication unit 11 (step S6). In a case where the fusion splicer 10 receives selection indicative of "do not perform pairing", the fusion splicer 10 ends the process using the authentication processing unit 12 (step S7).

Subsequently, the information terminal 20, which receives information (pairing selection result information) indicative of "perform pairing", performs setting of the predetermined cycle, at which the theft sensing, sensing of the radio wave intensity, sensing of the response time, and the like are performed, using the acquisition unit 24. The information terminal 20 displays the interval (for example, every 1 minute, every 10 minutes, every hour, or every day) for sensing the existence/non-existence of the theft in the theft sensing system 1 or the total time (10 minutes, one hour, 1 day, 30 days, or the like) for sensing the existence/ non-existence of the theft, on the display as the selection screen using, for example, display unit 23, and performs setting of the desired interval or the total time, which is selected by the operator, using the acquisition unit 24. The information terminal 20 transmits the information (pairing setting information), such as the desired interval or the total time, to the paired fusion splicer 10 (step S9). The information terminal 20 may transmit the pairing information (the pairing selection result information) received by the fusion splicer 10 to the management server which generalizes the entire system (step S8). In step S8, the information (the pairing selection result information and the pairing setting information) may be transmitted to the management server after the setting of the sensing interval, the total time, and the like is performed. With the above process, the theft sensing system 1 starts the theft sensing.

Figure 9:
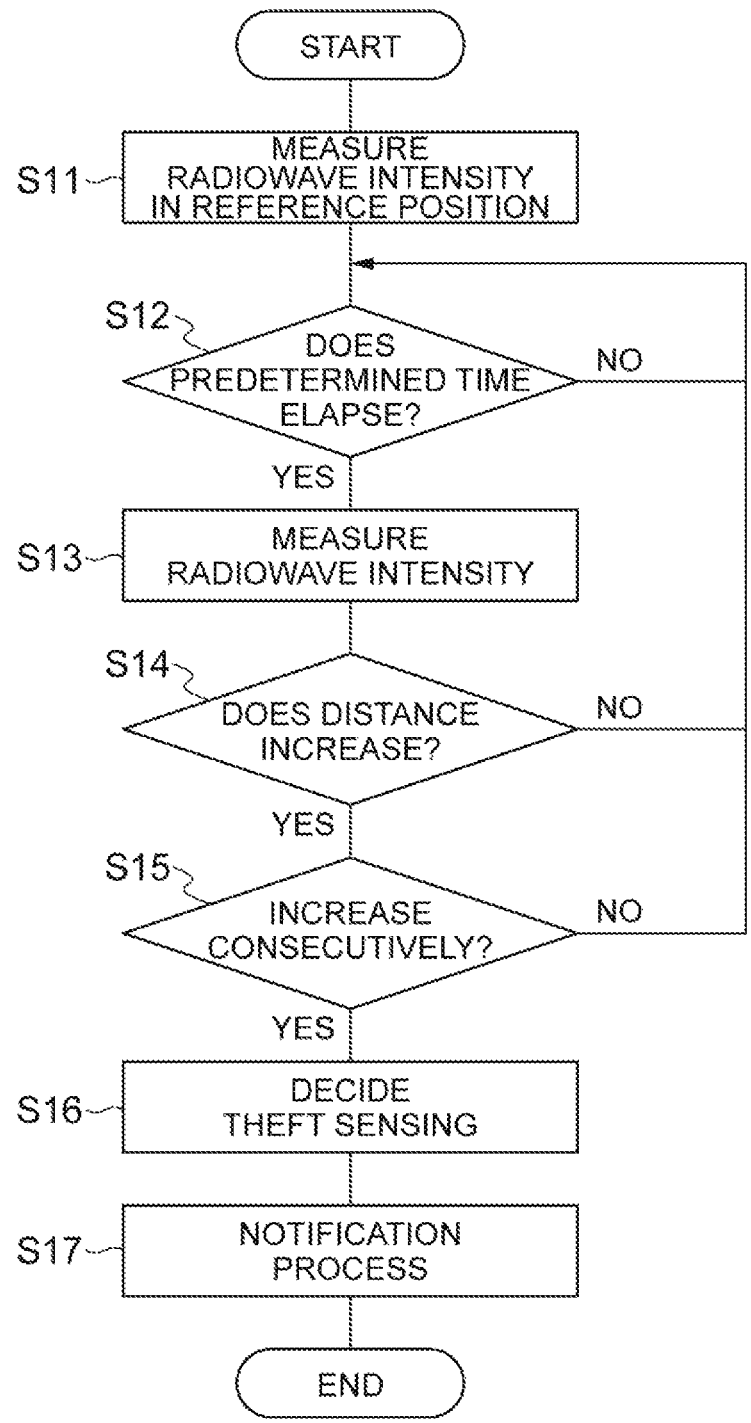
FIG. 9 is a flowchart illustrating a method for sensing a theft of the fusion splicer by the theft sensing system illustrated in FIG. 3.

Next, a method for sensing the theft of the paired fusion splicer 10 using the information terminal 20 is described with reference to FIG. 9. FIG. 9 is a flowchart illustrating the method for sensing the theft in the theft sensing system 1.

As illustrated in FIG. 9, the fusion splicer 10 and the information terminal 20, on which the pairing process is performed, are disposed within 1 m, the radio wave intensity between the fusion splicer 10 and the information terminal 20 (in a reference position) at this time is measured by the acquisition unit 24 (step S11). In the embodiment, for example, the radio wave intensity at this time is set to −40 dBm.

Subsequently, the information terminal 20 determines whether or not predetermined time (for example, one hour) elapses after the theft sensing process starts by using the acquisition unit 24 (step S12). In a case where the predetermined time elapses as a result of the determination of the elapse of the predetermined time in step S12, the information terminal 20 measures the radio wave intensity between the fusion splicer 10 and the information terminal 20 again by using the acquisition unit 24. The decision unit 25 of the information terminal 20 collates the measured radio wave intensity with the distance table 29, and calculates the distance between the fusion splicer 10 and the information terminal 20. In a case where the distance is longer than the distance based on the radio wave intensity measured before, the process proceeds to step S15.

In the information terminal 20, in a case where it is decided that the distance between the fusion splicer 10 and the information terminal 20, which is collated and calculated based on the measured radio wave intensity and the distance table 29, is longer than the distance based on the radio wave intensity measured before a predetermined number of time (for example, three consecutive times) (step S15) in the decision in step S14, the decision unit 25 senses that the fusion splicer 10 moves in the direction away from the information terminal 20, that is, the fusion splicer 10 is in the theft state (step S16). In a case where it is sensed that the fusion splicer 10 is in the theft state, the notification process, such as buzzer, is performed in the information terminal 20, and a notification is provided to the user (step S17). The user can know that the fusion splicer 10 is in the theft state through the notification. In a case where the fusion splicer 10 is in the theft state and it is possible to transmit the information to the fusion splicer 10 (in a case where wireless connection is not disconnection yet), a signal, which indicates that the fusion splicer 10 moves in the direction away from the information terminal 20, may be transmitted to the fusion splicer 10 and the lock using the lock unit 15 may be performed in the fusion splicer 10. Although a theft sensing decision method is illustrated using the radio wave intensity as an example in the above-described example, a case where the theft sensing is performed using the response time illustrated in FIG. 6 is performed in the same manner.

Next, the lock process performed on the fusion splicing mechanisms in the fusion splicer 10 is described with reference to FIG. 10. Although some or all of a sequence illustrated in FIG. 10 include processes which substantially overlap a theft sensing flow illustrated in FIG. 9, the sequences may be separately performed.

In a case where the predetermined sensing interval elapses (step S21), the information terminal 20 transmits (uploads) the message signal (the situation check information) (for example, the TXT file) which indicates whether or not the theft of the fusion splicer 10 occurs to the fusion splicer 10 (step S22). The signal includes the pairing information having the pairing number. The message signal is not limited to the text file.

Subsequently, the fusion splicer 10 which receives the message signal extracts the pairing number from the signal, and the lock unit 15 checks the pairing number in the file (step S23). In a case where the pairing number is consistent with a number which is stored in the fusion splicer 10 in advance, the lock unit 15 deletes the received message signal (the situation check information) (step S24). In a case where the pairing number is not consistent in step S24, the process returns to step S23. The fusion splicer 10 performs a check operation on the predetermined cycle to check whether or not the pairing number is not consistent or the message signal from the information terminal 20 is not received (non-checked) predetermined consecutive number of times (step S25).

Subsequently, in a case where it is determined that the pairing number is not consistent or the message signal from the information terminal 20 is not received (non-checked) predetermined consecutive number of times in the decision in step S25 in the fusion splicer 10, the lock unit 15 determines that the fusion splicer 10 is in the theft state, proceeds to step S26, and locks a fusion function of the fusion splicer 10 (step S26). Thereby, in a case where the theft of the fusion splicer 10 occurs, it is possible to cause the fusion splicer 10 to be disabled.

Hereinabove, according to the theft sensing system 1 of the present invention, it is possible to sense that the fusion splicer 10 moves in the direction away from the position of the information terminal based on the position of the information terminal 20 which is normally portable by the user and to easily notify a fact of the movement to the user. Thus, it is possible to prevent the theft of the fusion splicer 10.

The theft sensing system 1 includes the distance table 29 in which the relationship between the wireless situation data between the fusion splicer 10 and the information terminal 20 and the distance between the fusion splicer 10 and the information terminal 20 is predetermined. The decision unit 25 collates the wireless situation data acquired by the acquisition unit 24 with the distance table 29, and calculates the distance between the fusion splicer 10 and the information terminal 20. In a case where the calculated distance is longer than the distance calculated before, the decision unit 25 decides that the fusion splicer 10 moves in the direction away from the information terminal 20. According to the theft sensing system 1, the movement of the fusion splicer 10 is decided using the predetermined distance table 29, and thus it is possible to simplify a decision process.

In the theft sensing system 1, the acquisition unit 24 acquires the wireless situation data which includes the radio wave intensity between the fusion splicer 10 and the information terminal 20 and the response time of the wireless communication between the fusion splicer 10 and the information terminal 20. According to the theft sensing system 1, illegal movement of the fusion splicer 10 is decided using information relevant to a wireless device which is often provided to add another function (for example, general data management of the fusion splicer or the like), and thus it is possible to provide a new function, that is, theft prevention, to the fusion splicer 10 without adding new components or reducing the addition of the new components.

In the theft sensing system 1, the acquisition unit 24 consecutively acquires the wireless situation data on the predetermined cycle. Since the wireless situation data is consecutively acquired on the predetermined cycle, it is possible to continue to sense that the fusion splicer 10 is separated from the information terminal 20 due to the movement. Thus, the movement of the fusion splicer 10 other than the theft is excluded from the decision and the decision of the theft of the fusion splicer 10 is more certainly performed, thereby enabling the theft to be prevented more and more.

The theft sensing system 1 further includes the lock unit 15 which locks a function of the fusion splicer in the fusion splicer 10 in a case where the decision unit 25 decides that the fusion splicer 10 moves in the direction away from the information terminal 20 or in a case where it is decided that the wireless communication between the fusion splicer 10 and the information terminal 20 is disconnected. According to the theft sensing system 1, even in a case where the theft of the fusion splicer 10 occurs, the fusion splicer 10 is locked (disabling process) from the information terminal 20. Thus, it is difficult to release the lock even in a case of the theft of the fusion splicer 10, and thus it is possible to prevent the theft of the fusion splicer 10 more and more. In this case, the theft sensing system 1 may further include the releasing unit 27 which releases the lock performed by the lock unit 15. In a case where such release means is provided, the lock is released through an appropriate recovery procedure performed by the proper user even in a case where the fusion splicer 10 is locked, and thus it is possible to allow the fusion splicer 10 to be used again. The releasing unit may be provided on the server which acquires the information of the authentication perforated by the authentication processing unit 22, and the server may transmit a signal for releasing the lock performed by the lock unit 15 by using the information of the authentication to the fusion splicer 10. In this case, it is also possible to acquire the same advantages.

The theft sensing system 1 further includes the position acquisition unit 28 which acquires the positional information of the fusion splicer 10. It is possible to accumulate the positional information relevant to the theft position in the theft report or the theft insurance on the information terminal 20 even in a case where the theft occurs. Thus, even in the case where the theft occurs, it is possible to simplify various processes after the theft occurs. The positional information may be acquired in a case where the decision unit 25 decides that the fusion splicer 10 moves in the direction away from the information terminal 20 or in a case where the decision unit 25 decides that the wireless communication between the fusion splicer 10 and the information terminal 20 is disconnected. The positional information may be periodically acquired, preserved, and updated at predetermined time intervals, and the newest positional information, which is acquired in a case of being decided as above, may be preserved.

REFERENCE SIGNS LIST 1 theft sensing system
10 fusion splicer
11, 21 wireless communication unit
12, 22 authentication processing unit
13, 23 display unit
14 response processing unit
15 lock unit
20 information terminal
24 acquisition unit
25 decision unit
26 notification unit
27 releasing unit
28 position acquisition unit
29 distance table

The invention claimed is:

1. A theft sensing system for sensing a theft of a fusion splicer by using an information terminal, comprising:
   a wireless communication unit that enables the fusion splicer to perform wireless communication with the information terminal;
   an authentication processing unit that performs an authentication process such that the fusion splicer and the information terminal are wirelessly connected to each other;
   an acquisition unit that acquires wireless situation data between the fusion splicer and the information terminal which are wirelessly connected to each other through the authentication process;
   a decision unit that decides whether or not the fusion splicer moves in a direction away from the information terminal based on a change in the wireless situation data acquired by the acquisition unit;
   a notification unit that performs a predetermined notification process in the information terminal in a case where the decision unit decides that the fusion splicer moves in the direction away from the information terminal;
   a lock unit that locks a function of the fusion splicer in the fusion splicer in a case where the decision unit decides that the fusion splicer moves in the direction away from the information terminal or in a case where the decision unit decides that wireless communication between the fusion splicer and the information terminal is disconnected;
   a releasing unit that controls the release of the lock performed by the lock unit; and
   a server that acquires information of authentication performed by the authentication processing unit,
   wherein the releasing unit is provided in the server, and the server is capable of transmitting a signal for releasing the lock performed by the lock unit to the fusion splicer by using the information of the authentication.

2. The theft sensing system according to claim 1, further comprising:
   a distance table in which a relationship between the wireless situation data between the fusion splicer and the information terminal and a distance between the fusion splicer and the information terminal is predetermined,
   wherein the decision unit calculates the distance between the fusion splicer and the information terminal by collating the wireless situation data acquired by the acquisition unit with the distance table, and decides that the fusion splicer moves in the direction away from the information terminal in a case where the calculated distance is longer than a distance calculated before.

3. The theft sensing system according to claim 1, wherein the acquisition unit acquires the wireless situation data which includes radio wave intensity between the fusion splicer and the information terminal.

4. The theft sensing system according to claim 1, wherein the acquisition unit acquires the wireless situation data which includes a response time of the wireless communication between the fusion splicer and the information terminal.

5. The theft sensing system according to claim 1, wherein the acquisition unit consecutively acquires the wireless situation data on a predetermined cycle.

6. The theft sensing system according to claim 1, further comprising:
   an additional releasing unit that controls release of the lock performed by the lock unit, wherein the additional releasing unit is provided on the information terminal.

7. The theft sensing system according to claim 1, further comprising:
   a position acquisition unit that acquires positional information of the fusion splicer.

8. A theft sensing system for sensing a theft of a fusion splicer by using an information terminal, the theft sensing system comprising:

a wireless communication unit that performs wireless communication with the information terminal;

an authentication processing unit that performs an authentication process for wirelessly connecting the fusion splicer with the information terminal;

a response processing unit that provides a response for wireless situation data between the fusion splicer and the information terminal which are wirelessly connected through the authentication process to the information terminal, the response being information for deciding that the fusion splicer moves in a direction away from the information terminal a lock unit that locks a function of the fusion splicer in a case where the response processing unit decides that the fusion splicer moves in the direction away from the information terminal or in a case where the response processing unit decides that wireless communication between the fusion splicer and the information terminal is disconnected, a releasing unit that controls the release of the lock performed by the lock unit; and a server that acquires information of authentication performed by the authentication processing unit, wherein the releasing unit is provided in the server, and the server is capable of transmitting a signal for releasing the lock performed by the lock unit to the fusion splicer by using the information of the authentication.

* * * * *